(12) United States Patent
Kawabe et al.

(10) Patent No.: US 7,047,934 B1
(45) Date of Patent: May 23, 2006

(54) FUEL INJECTION TYPE INTERNAL COMBUSTION ENGINE AND VEHICLE PROVIDED WITH THE SAME

(75) Inventors: Hideaki Kawabe, Shizuoka (JP); Akihiko Ookubo, Shizuoka (JP); Yorio Futakuchi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 11/197,886

(22) Filed: Aug. 5, 2005

(51) Int. Cl.
*F02B 31/00* (2006.01)
(52) U.S. Cl. .................. 123/306; 701/105; 123/188.14
(58) Field of Classification Search ................ 123/306, 123/188.14; 701/105
See application file for complete search history.

(56) References Cited

U.S. PATENT DOCUMENTS 5,359,972 A   11/1994  Isaka
5,586,539 A * 12/1996  Yonekawa et al. .......... 123/458
5,797,365 A *  8/1998  Kim ....................... 123/184.56
5,852,994 A * 12/1998  Tsuzuku et al. ............ 123/308
6,131,554 A   10/2000  Ito et al.

* cited by examiner

*Primary Examiner*—Erick R. Solis
(74) *Attorney, Agent, or Firm*—Keating & Bennett, LLP (57) ABSTRACT

An internal combustion engine includes an engine body including a cylinder that defines a combustion chamber, an intake opening that faces the combustion chamber, and an intake passage in communication with the combustion chamber through the intake opening, a piston provided in the cylinder, an intake valve that opens and closes the intake opening, a throttle valve provided in the intake passage, and an injector that injects fuel between the throttle valve in the intake passage and the intake opening. A ratio of a volume of the portion that extends from the throttle valve in the intake passage to the intake opening, to a stroke volume of the cylinder is at most approximately 0.61. The time period in which fuel injection from the injector is terminated during an idling operation is set within a period of time after one intake stroke has been completed and before the next intake stroke is begun.

11 Claims, 10 Drawing Sheets

FIG. 11 ent of the throttle valve 13. Here, the intake passage 11 includes a portion that extends from the throttle valve 13 in the intake passage 11 to the intake opening 54.

FUEL INJECTION TYPE INTERNAL COMBUSTION ENGINE AND VEHICLE PROVIDED WITH THE SAME

BACKGROUND OF THE INVENTION

1. Field of the Invention

The present invention relates to a fuel injection type internal combustion engine and a vehicle provided with the same.

2. Description of the Related Art

Conventionally, control has been performed to make an air-fuel ratio of an internal combustion engine a theoretical air-fuel ratio in order to purify exhaust gases with a ternary catalyst. In case of performing such control, however, there is caused a problem that even an engine capable of a stable operation in a region of high-speed rotation is liable to become unstable in a region of low-speed rotation such as idling or the like.

Engines have been expected to be capable of stably performing an operation with a theoretical air-fuel ratio even in a region of low-speed rotation. To satisfy this requirement, there has been proposed an engine in which a ratio (volume ratio) $\epsilon = Q/V$ of a volume Q downstream of a throttle valve in an intake passage to a stroke volume V is set on the basis of a valve overlap period (see U.S. Pat. No. 6,131,554). However, it is desirable in some cases to set specifications or the like according to a type of an engine without being restrained by constraints for a volume ratio and a valve overlap period.

SUMMARY OF THE INVENTION

In order to overcome the problems described above, preferred embodiments of the present invention provide a new internal combustion engine that is capable of stably performing an operation with a theoretical air-fuel ratio even in a region of low-speed rotation.

An internal combustion engine according to a preferred embodiment of the present invention includes an engine body having a cylinder that defines a combustion chamber, an intake opening that faces the combustion chamber, and an intake passage in communication with the combustion chamber through the intake opening, a piston provided in the cylinder, an intake valve that opens and closes the intake opening, a throttle valve provided in the intake passage, and an injector that injects a fuel between the throttle valve in the intake passage and the intake opening, and in which intake stroke, compression stroke, expansion stroke, and exhaust stroke are repeated in this order, a ratio of a volume of the portion that extends from the throttle valve in the intake passage to the intake opening, to a stroke volume of the cylinder is at most about 0.61, and timing, in which fuel injection from the injector is terminated during idling operation, is set in a period of time after a current intake stroke is terminated and before the next intake stroke is begun.

With the internal combustion engine according to a preferred embodiment of the present invention, a fuel in the intake passage can be sufficiently atomized and made uniform before the start of an intake stroke owing to a synergistic effect that the injector injects a fuel downstream of the throttle valve, the intake passage is small in volume downstream of the throttle valve, and a timing in which the fuel injection is terminated does not occurring during the intake stroke. Since a uniform air-fuel mixture is drawn into the combustion chamber during the intake stroke, it is possible to stably perform an operation with a theoretical air-fuel ratio also in a region of low-speed rotation.

Other features, elements, characteristics and advantages of the present invention will be apparent from the following detailed description of preferred embodiments with reference to the attached drawings.

DETAILED DESCRIPTION OF PREFERRED EMBODIMENTS

Figure 1:
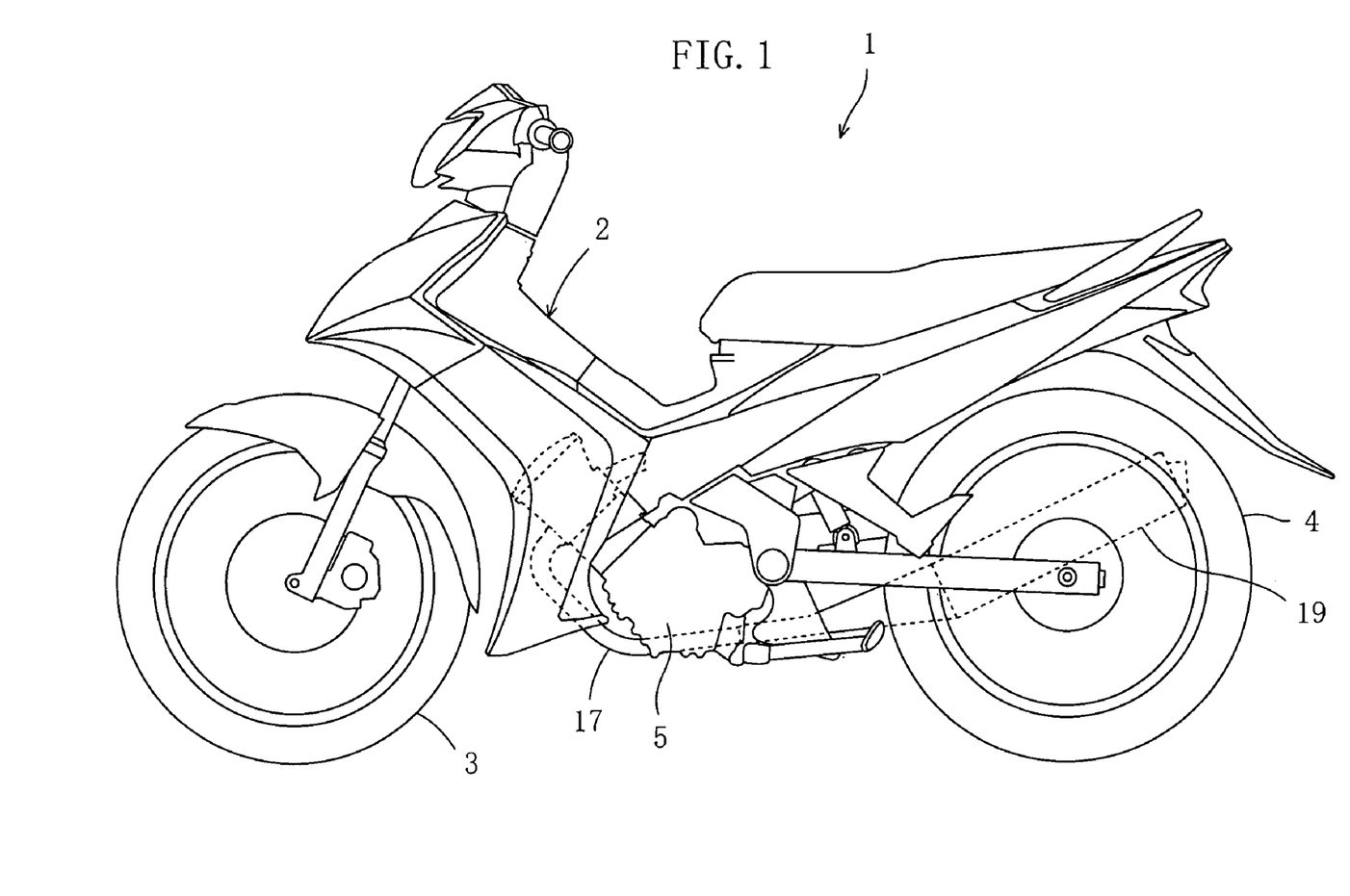
FIG. 1 is a side view showing a motorcycle.

As shown in FIG. 1, a vehicle according to a preferred embodiment is preferably a motorcycle 1, for example. However, the vehicle according to the present invention is not limited to the motorcycle 1. The vehicle according to the present invention may be another saddle-ride type vehicle or a vehicle other than the saddle-ride type vehicle. The term "motorcycle" includes scooters, etc. in addition to so-called motorbikes.

The motorcycle 1 includes a vehicle body 2, a front wheel 3 and a rear wheel 4, which are mounted to the vehicle body 2, and an engine 5 that drives the rear wheel 4 through a drive chain (not shown). In the present preferred embodiment, the engine 5 preferably includes a single cylinder 4-cycle internal combustion engine. However, the engine 5 is in no way limited in number of cylinders, etc.

Figure 2:
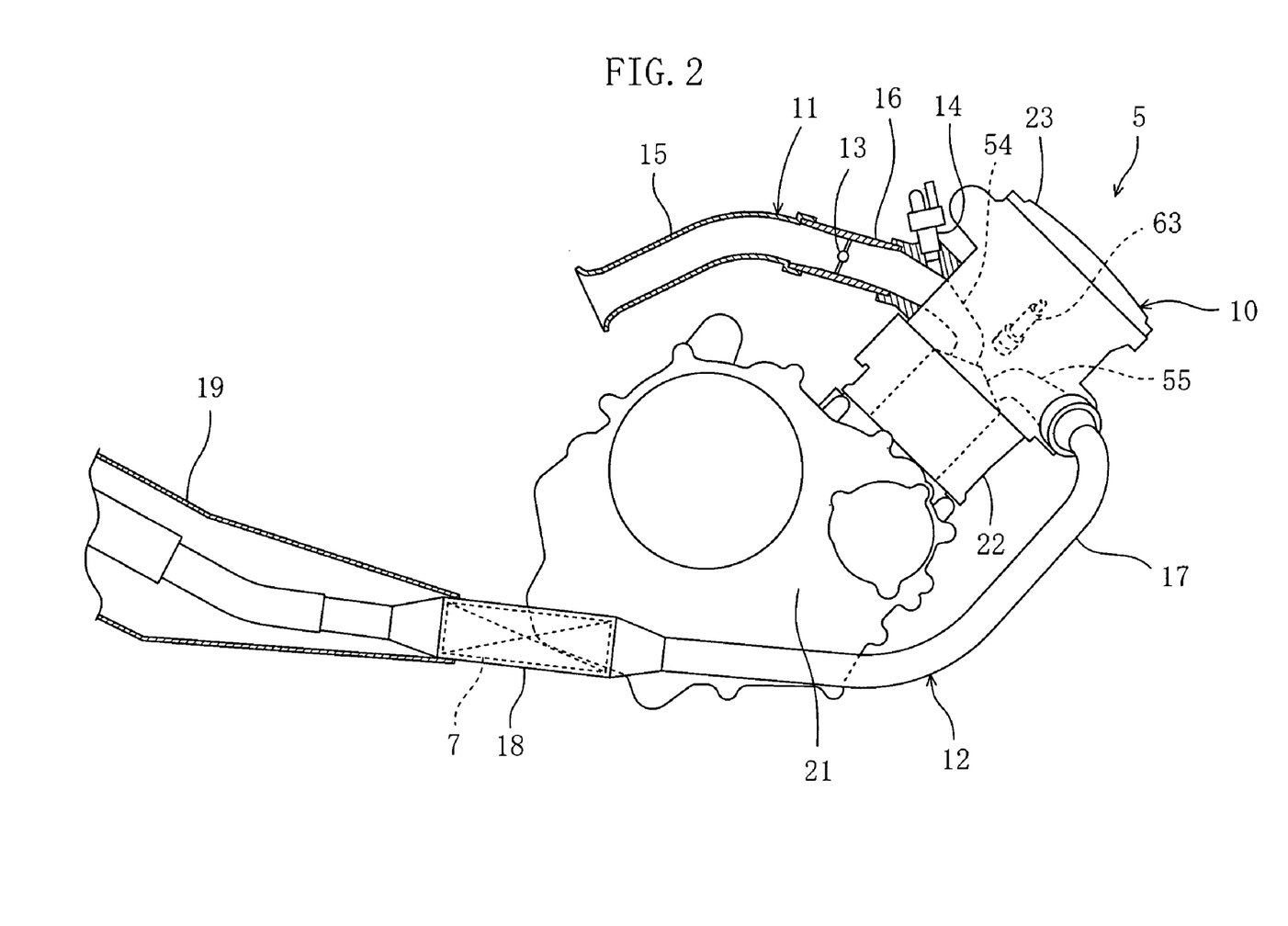
FIG. 2 is a view showing the construction of an engine.

As shown in FIG. 2, the engine 5 includes an engine body 10, an intake passage 11, and an exhaust passage 12. The engine body 10 includes a crankcase 21, in which a crankshaft 42 (see FIG. 3) or the like is accommodated, a cylinder 22 unified with the crankcase 21, and a cylinder head 23 mounted to the cylinder 22. In addition, according to the present preferred embodiment, the crankcase 21 and the cylinder 22 are unified together to form a cylinder block. However, the crankcase 21 and the cylinder 22 may be formed separately and assembled with each other.

The intake passage 11 includes an intake pipe 15 connected to an air cleaner (not shown), a throttle body 16, and intake ports 54 formed in the cylinder head 23. A downstream end of the intake pipe 15 is connected to an upstream end of the throttle body 16, and a downstream end of the throttle body 16 is connected to the cylinder head 23. A throttle valve 13 is provided within the throttle body 16. An injector 14 is mounted to the cylinder head 23. That is, the injector 14 is arranged in the intake passage 11 downstream of the throttle valve 13. Accordingly, the injector 14 injects a fuel between the throttle valve 13 and an intake opening 52 (see FIG. 3) described later.

The exhaust passage 12 includes exhaust ports 55 formed on the cylinder head 23, an exhaust pipe 17 connected to the cylinder head 23, a catalyst casing 18 provided on the exhaust pipe 17, and a muffler 19 provided at a tip end of the exhaust pipe 17. A ternary catalyst 7 is accommodated within the catalyst casing 18.

Figure 3:
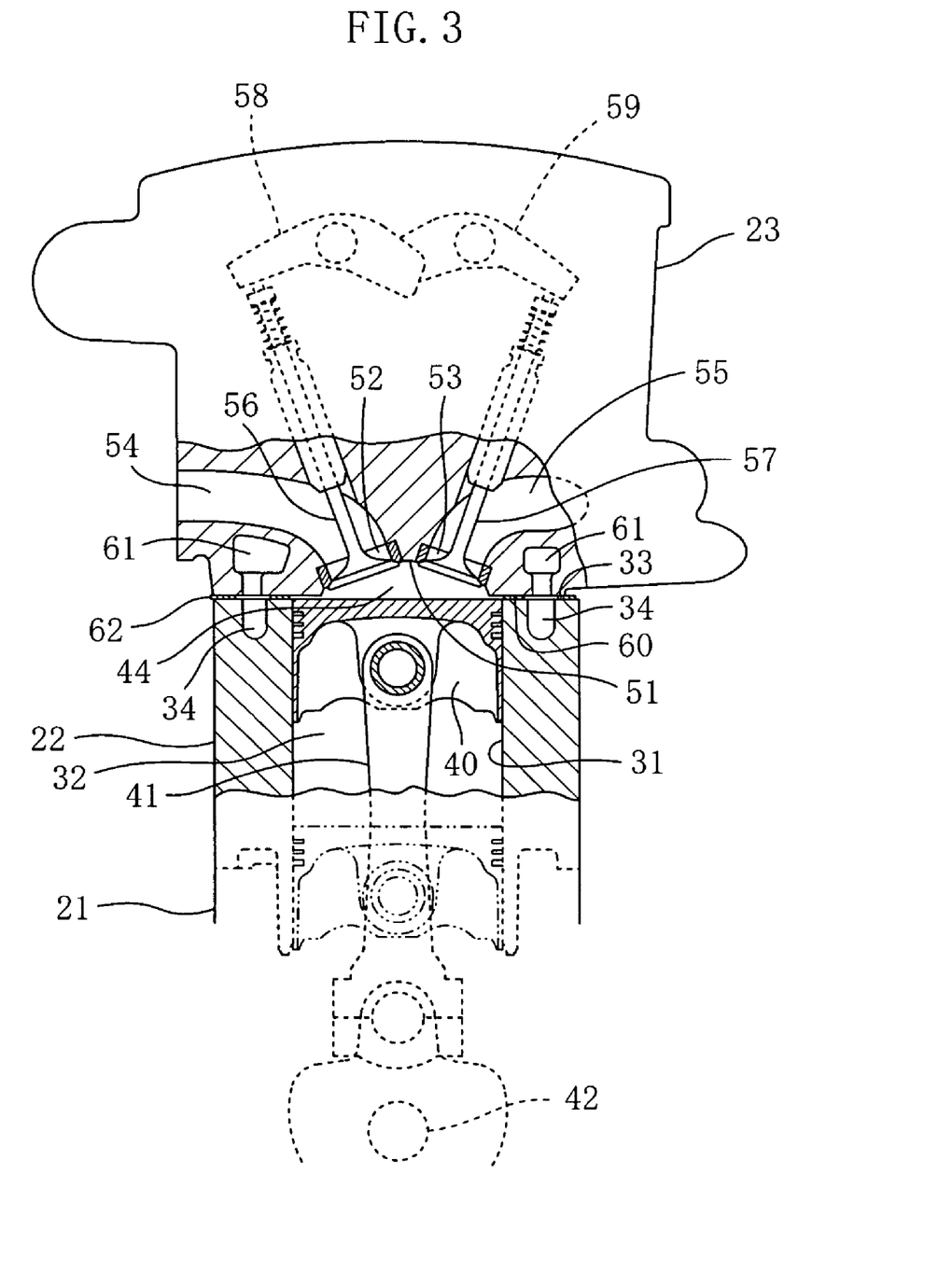
FIG. 3 is a cross sectional view showing an essential part of the engine.

As shown in FIG. 3, a cylinder inner surface 31 defines a columnar-shaped cylinder chamber 32 inside the cylinder 22, and a piston 40 is accommodated in the cylinder chamber 32. The piston 40 is connected to a connecting rod 41, and the connecting rod 41 is connected to the crankshaft 42. A water jacket 34 is formed on an upper surface of the cylinder 22, that is, an opposed surface 33 opposed to the cylinder head 23. The water jacket 34 is arranged so as to surround a periphery of the cylinder chamber 32 as viewed in a longitudinal direction (a vertical direction in FIG. 3) of the cylinder 22.

A pent roof type recess 51 is disposed on a lower surface of the cylinder head 23, that is, a head inner surface 60. However, the recess 51 is not limiting in shape but may be, for example, semi-spherical or multi-spherical in shape. A combustion chamber 44 is defined by the recess 51, the cylinder inner surface 31, and an upper surface of the piston 40.

Figure 4:
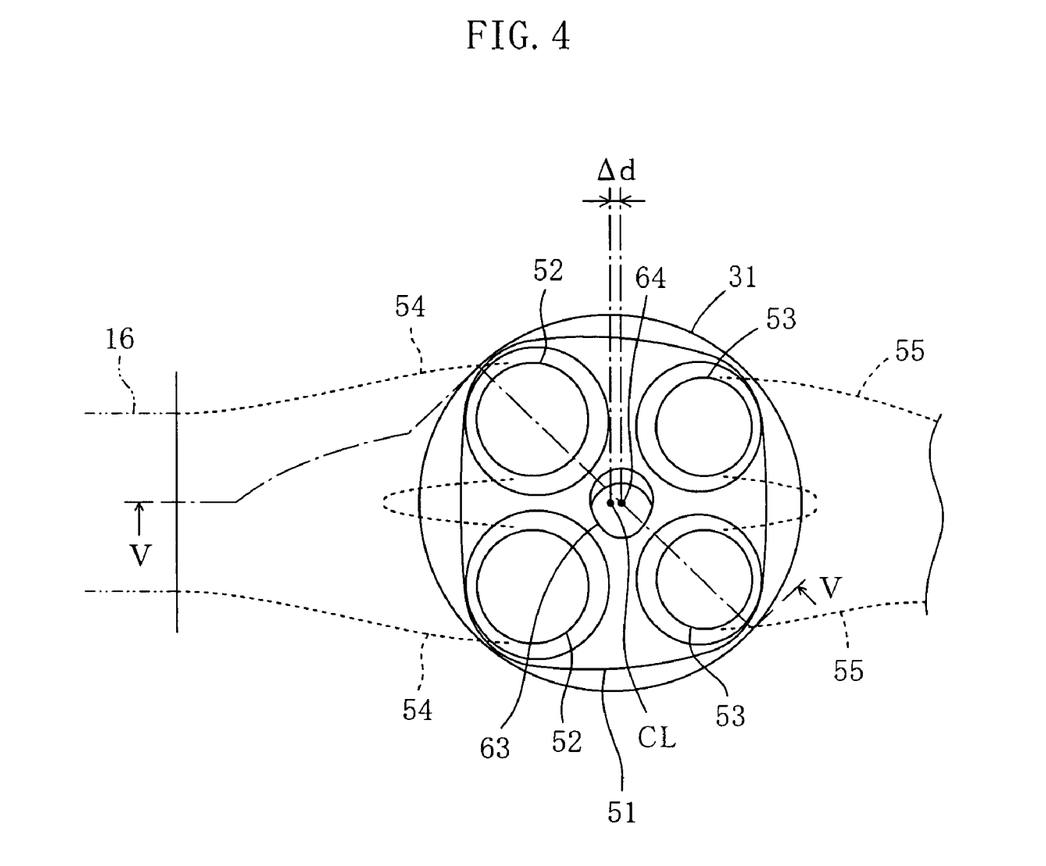
FIG. 4 is a bottom view showing a cylinder head.

As shown in FIG. 4, the recess 51 preferably includes with two intake openings 52 and two exhaust openings 53. The intake openings 52 are preferably disposed on a rear side (a left side in FIG. 4) of the vehicle body 2 to be arranged in a right and left direction (a vertical direction in FIG. 4) of the vehicle body 2. The exhaust openings 53 are preferably disposed on a front side (a right side in FIG. 4) of the vehicle body 2 to be arranged in the right and left direction of the vehicle body 2. The intake openings 52 and the exhaust openings 53 are located in positions offset from a cylinder axis CL, and arranged so as to surround the cylinder axis CL. In addition, the intake openings 52 have a larger open area than the exhaust openings 53.

As shown in FIG. 3, the cylinder head 23 is formed with the intake ports 54 that are in communication with the combustion chamber 44 through the respective intake openings 52, and exhaust ports 55 that are in communication with the combustion chamber 44 through the respective exhaust openings 53. As shown in FIG. 4, the intake ports 54 join together to be communicated to the throttle body 16. Also, the exhaust ports 55 join together to be in communication with the exhaust pipe 17.

As shown in FIG. 3, the cylinder head 23 is provided with intake valves 56 that open and close the intake openings 52, and exhaust valves 57 that open and close the exhaust openings 53. The intake valves 56 and the exhaust valves 57, respectively, are biased in directions in which the intake openings 52 and the exhaust openings 53 are closed. Also, the cylinder head 23 is provided with rocker arms 58, 59, respectively, that periodically open and close the intake valves 56 and the exhaust valves 57. However, a valve operating mechanism that opens and closes the intake valves 56 and the exhaust valves 57 is in no way limiting.

A water jacket 61 is formed on the inner surface 60 of the cylinder head 23. The water jacket 61 is arranged at a position corresponding to the water jacket 34 in the cylinder 22. A gasket 62 is interposed between the cylinder head 23 and the cylinder 22. The gasket 62 is formed with a plurality of holes (not shown) that provide communication between the water jacket 61 in the cylinder head 23 and the water jacket 34 in the cylinder 22.

Figure 5:
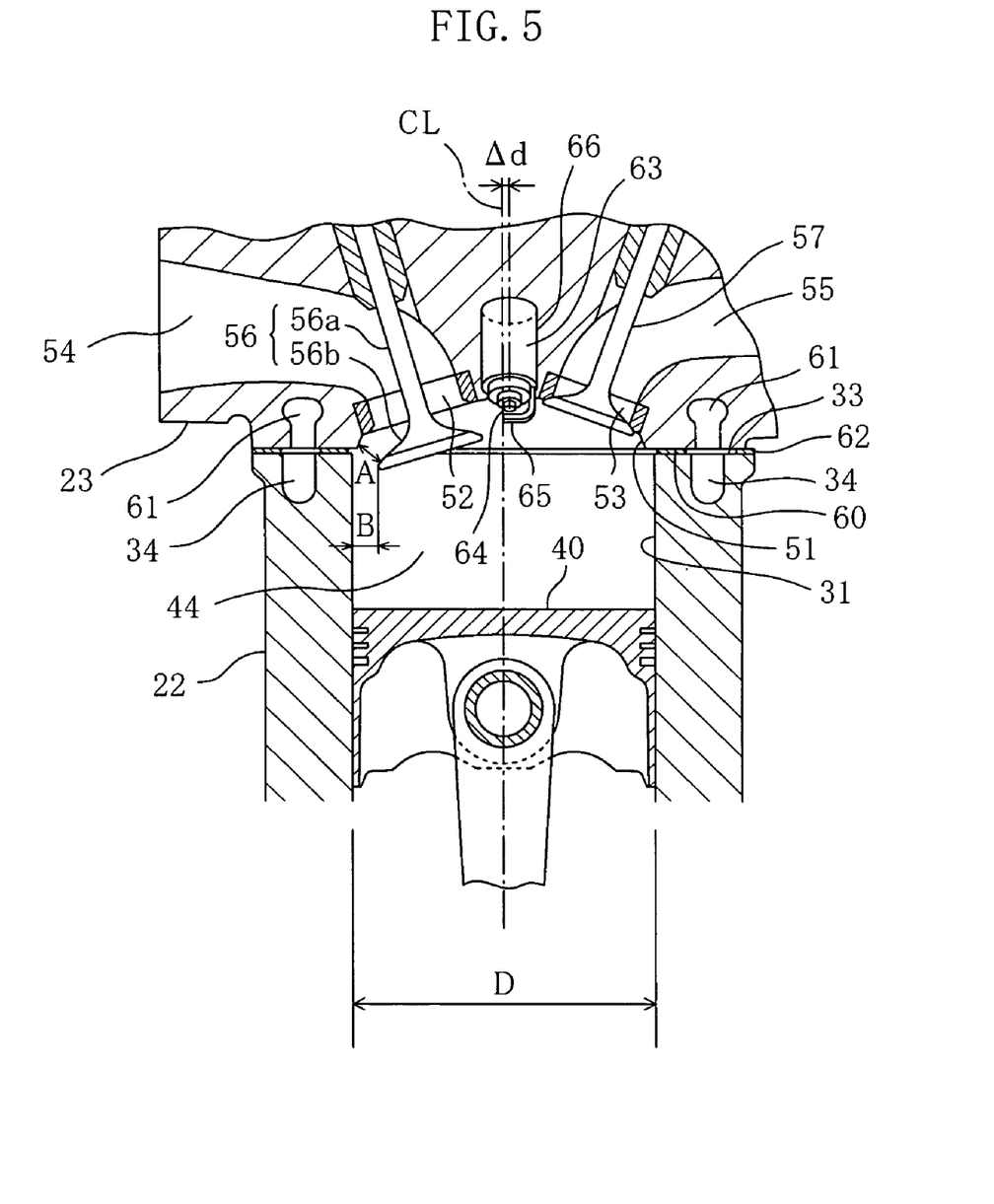
FIG. 5 is a cross sectional view taken along the line V—V in FIG. 4.

As shown in FIG. 5, the intake ports 54 preferably include a so-called tumble port. More specifically, the intake ports 54 make flow passages that cause an air-fuel mixture, which is introduced into the combustion chamber 44 through the intake openings 52, to generate vertical vortex flows (tumble flows) in the combustion chamber 44. Also, the intake ports 54 are formed so as to have the air-fuel mixture drifting toward the cylinder axis CL in the intake openings 52. Here, as compared with the exhaust ports 55, the intake ports 54 are formed to be relatively straight in regions (upstream regions) away from the combustion chamber 44 and curved relatively acutely in regions (downstream regions) near to the combustion chamber 44.

However, the intake ports 54 in the present preferred embodiment preferably include flow passages that are liable to generate vortex flows in the combustion chamber 44, and the intake ports 54 are not limited in specific configuration. The intake ports 54 may include flow passages that form transverse vortex flows, that is, swirl flows within the combustion chamber 44.

In addition, "cylinder axis CL" is referred to herein as a region except the vicinity of the cylinder inner surface 31 and means a relatively wide region. Accordingly, with, for example, the upwardly left intake opening 52 in FIG. 4, "drifting toward the cylinder axis CL" referred to herein includes not only having the air-fuel mixture drifting rightward and obliquely downward in FIG. 4 but also having the air-fuel mixture drifting rightward (toward the exhaust opening 53) and having the air-fuel mixture drifting downward (toward the other intake opening 52).

As shown in FIG. 5, the intake valves 56 include a shaft 56a and an umbrella portion 56b provided at a tip end of the shaft 56a. In addition, the exhaust valves 57 preferably have the same construction as that of the intake valves 56.

As shown in FIG. 5, when the intake valves 56 are opened, gaps are formed between the recess 51 of the cylinder head 23 and the intake valves 56 (more specifically, the umbrella portions 56b of the intake valves 56). The air-fuel mixture flows into the combustion chamber 44 through the gaps from the intake ports 54. While the gaps are preferably provided all around the umbrella portions 56b of the intake valves 56, the gaps are preferably smallest in the vicinity of the cylinder inner surface 31.

In the present preferred embodiment, when the intake valves 56 are opened, minimum gaps A between the intake valves 56 and the recess 51 become equal to or larger than gaps B (in other words, gaps between the intake valves 56 and the cylinder inner surface 31 as viewed in an axial direction of the cylinder) between the intake valves 56 and the cylinder inner surface 31 in a diametrical direction (that is, a diametrical direction of the cylinder 22) of the combustion chamber 44. In this manner, according to the present preferred embodiment, the intake valves 56 are provided in positions close to the cylinder inner surface 31 and the intake openings 52 are located at positions close to the cylinder inner surface 31, as viewed in the axial direction of the cylinder. Therefore, an excess space corresponding to amounts by which the intake valves 56 and the intake openings 52 are close to the cylinder inner surface 31, is produced in a central region of the recess 51 of the cylinder head 23. In addition, while values of the gaps A and the gaps B are not specifically limited, these values are preferably, for example, about 2 mm to about 5 mm. The gaps A and the gaps B may also be about 3 mm to about 4 mm, for example.

The cylinder head 23 is provided with an ignition plug 63. The ignition plug 63 includes a plug body 66, a central electrode 64 provided at a tip end of the plug body 66, and a lateral electrode 65. The central electrode 64 and the lateral electrode 65 project toward the combustion chamber 44 from the recess 51 of the cylinder head 23. The ignition plug 63 is preferably arranged at a position that is offset toward the exhaust openings 53 from the cylinder axis CL. More specifically, the central electrode 64 of the ignition plug 63 is offset toward the exhaust openings 53 from the cylinder axis CL.

As described above, the intake openings 52 are provided at positions close to the cylinder inner surface 31. Therefore, as compared with conventional engines, it is possible in the engine 5 to arrange a position of the ignition plug 63 offset toward the intake openings 52 by amounts, by which the intake openings 52 are offset toward the cylinder inner surface 31. Therefore, it is possible to have a position of the ignition plug 63 approach the cylinder axis CL.

An offset Δd of the ignition plug 63 from the cylinder axis CL is preferably within about 5% of a bore diameter D of the cylinder 22, and especially preferably within about 3%. The bore diameter D may be, for example, about 50 mm to about 60 mm. The offset Δd is less than, for example, about 3 mm and may be equal to or less than about 1.5 mm. Also, the offset Δd may be about 1 mm to about 2 mm. By making the offset Δd small, generation of knocking can be effectively prevented and minimized even in combustion in, for example, a theoretical air-fuel ratio or in a lean region. In addition, the offset Δd may be 0. That is, the ignition plug 63 may be arranged on the cylinder axis CL.

Figure 6:
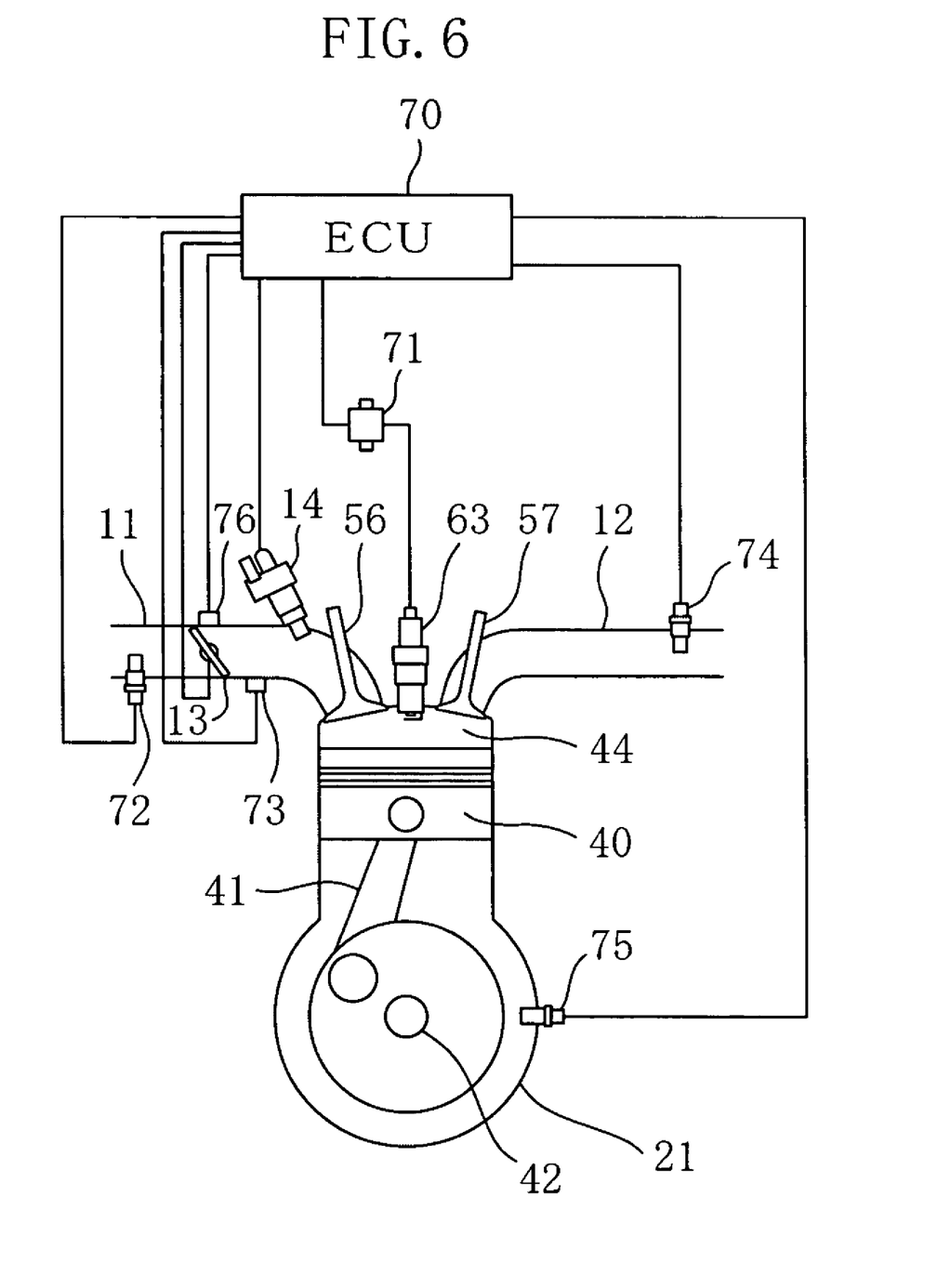
FIG. 6 is a view showing the configuration of a control device for the engine.

As shown in FIG. 6, a temperature sensor 72 that detects a temperature in the intake passage 11, a pressure sensor 73 that detects a pressure in the intake passage 11, and a throttle position sensor 76 that detects the opening degree of the throttle valve 13, are preferably provided in the intake passage 11 of the engine 5. In addition, the pressure sensor 73 is provided downstream of the throttle valve 13. An $O_2$ sensor 74 is provided in the exhaust passage 12. The crankcase 21 is provided with a crank angle sensor 75 that detects a crank angle. The sensors 72 to 76 are connected to an engine control unit (ECU) 70. In addition, the ECU 70 is connected to the ignition plug 63 through an ignition coil 71 to control the ignition timing of the ignition plug 63. Also, the ECU 70 is also connected to the injector 14 to control the fuel injection timing of the injector 14.

Figure 7:
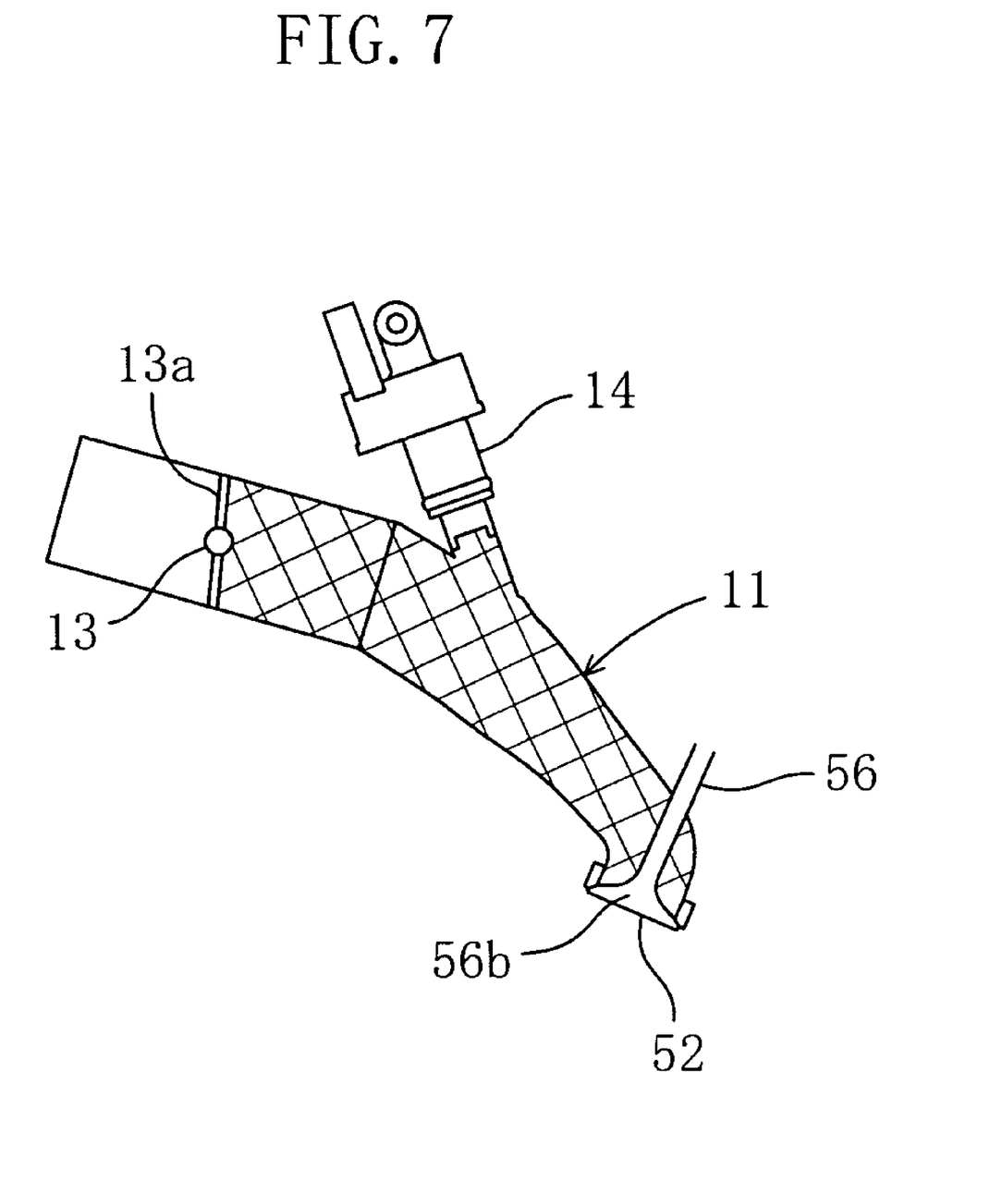
FIG. 7 is a view schematically showing a portion extending from a throttle valve in an intake passage to intake openings.

With the engine 5, a volume ratio $\epsilon=Q/V$ of a volume Q of that portion (specifically, as indicated by cross hatching in FIG. 7, a portion from a downstream outer surface of a valve plate 13a of the throttle valve 13 in a position of minimum opening degree to an upper surface of the umbrella portions 56b of the intake valves 56 in a closed state), which extends from the throttle valve 13 in the intake passage 11 to the intake openings 52, to a stroke volume V (bore diameter D× stroke of the piston 40) of the cylinder is preferably set to be at most about 0.61.

Figure 8:
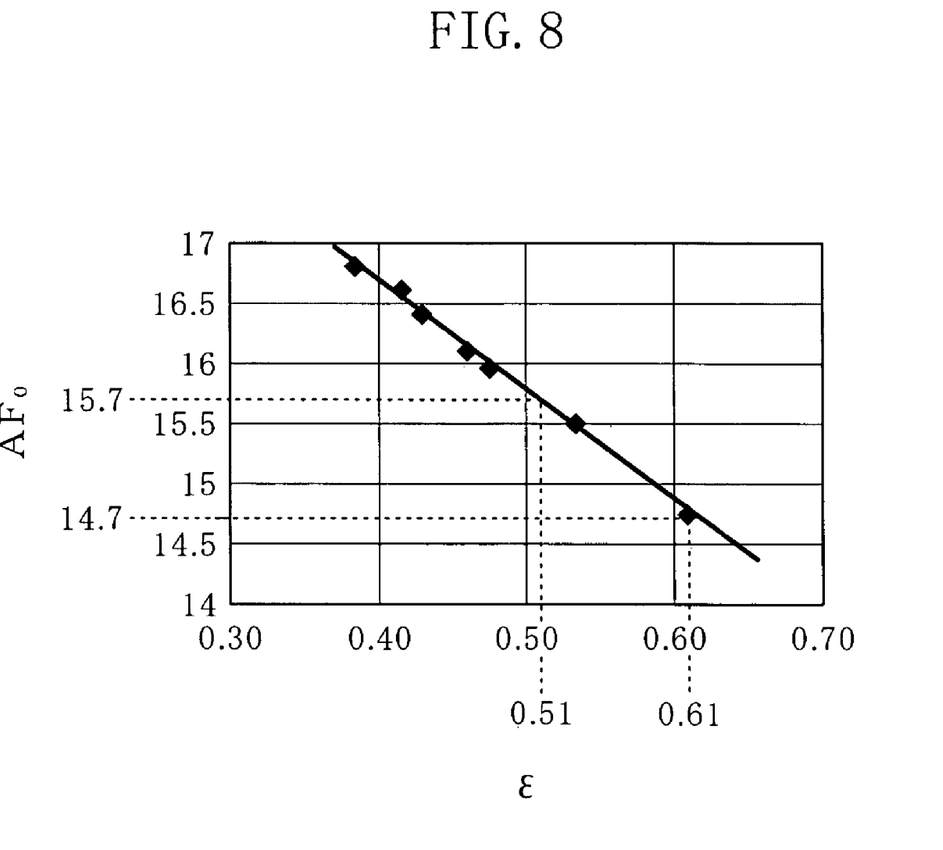
FIG. 8 is a graph illustrating the relationship between a volume ratio and a lean limit air-fuel ratio.

The inventors of the present application have made experiments and simulations to examine the relationship between the volume ratio $\epsilon$ and a lean limit air-fuel ratio $AF_0$. In addition, the lean limit air-fuel ratio means ahighest (that is, the fuel is thinnest) air-fuel ratio, in which a stable idling operation is possible. Table 1 indicates the results. FIG. 8 shows a characteristic curve (specifically, a straight line) representative of that relationship between the volume ratio $\epsilon$ and the lean limit air-fuel ratio $AF_0$, which have been discovered on the basis of the experiments and results of simulation. In addition, the volume Q was about 51.5 cc to about 81.6 cc in the experiments and the simulation.

TABLE 1

|  | Volume ratio $\epsilon$ | Lean limit air-fuel ratio $af_0$ |
| --- | --- | --- |
| Experiment | 0.38 | 16.8 |
| Experiment | 0.41 | 16.6 |
| Experiment | 0.53 | 15.5 |
| Simulation | 0.47 | 16.0 |
| Simulation | 0.46 | 16.1 |
| Simulation | 0.43 | 16.4 |
| Simulation | 0.61 | 14.7 |

It is seen from FIG. 8 that the smaller the volume ratio $\epsilon$, the larger the lean limit air-fuel ratio $AF_0$ during idling operation and that when the lean limit air-fuel ratio $AF_0$ is 14.7 (theoretical air-fuel ratio), the volume ratio $\epsilon$ is about 0.61. Accordingly, by making the volume ratio $\epsilon$ at most about 0.61, idling operation in the theoretical air-fuel ratio can be performed stably. In addition, when the volume ratio $\epsilon$ is made at most about 0.51, the lean limit air-fuel ratio $AF_0$ becomes about 15.7 or larger, so that an operation in the theoretical air-fuel ratio can be performed with a margin left.

With the engine 5, intake stroke, compression stroke, expansion stroke, and exhaust stroke are repeated in this order by reciprocating movements of the piston 40 in the cylinder 22. Here, the inventors of the present application have noticed that when the fuel injection timing of the injector 14 is changed during idling operation, the lean limit air-fuel ratio is varied.

Table 2 indicates results of experiments performed by the inventors of the present application. Table 2 represents the relationship between the fuel injection timing (specifically, timing, in which fuel injection is terminated) and the lean limit air-fuel ratio. In addition, crank angles in the Table assume a reference (crank angle=0) value when the piston 40 is positioned at a top dead center of exhaust.

TABLE 2

|  | Intake stroke | Compression stroke | Expansion stroke | Exhaust stroke |
| --- | --- | --- | --- | --- |
| Crank angle | 90° | 270° | 450° | 630° |
| Lean limit air-fuel ratio | 13.6 | 17.2 | 16.5 | 16.9 |

It is seen from Table 2 that in the case where the fuel injection timing does not occur during intake stroke, that is, occurs during a compression stroke, expansion stroke, or exhaust stroke, the lean limit air-fuel ratio increases as compared with the case where a fuel is injected during an intake stroke. The reason for this is considered in the following manner.

A fuel injected from the injector 14 flows into the combustion chamber 44 through the intake openings 52 when the intake valves 56 are opened. Therefore, a fuel injected from the injector 14 when the intake valves 56 are closed remains in the intake passage 11 until the intake valves 56 are opened. With the engine 5, the injector 14 is provided downstream of the throttle valve 13, the volume ratio $\epsilon$ is at most about 0.61 as described above, and a region of the intake passage 11 downstream of the throttle valve 13 is small in volume. Therefore, in the case where a fuel is injected when the intake valves 56 are opened, the fuel instantly flows into the combustion chamber 44 but in the case where a fuel is injected when the intake valves 56 are closed, the fuel is sufficiently atomized and evenly dispersed in a region of the intake passage 11 downstream of the throttle valve 13 until the intake valves 56 are opened. Therefore, when the intake valves 56 are opened afterward, a sufficiently atomized and uniform air-fuel mixture is drawn into the combustion chamber 44. Accordingly, it is considered that the lean limit air-fuel ratio increases.

In addition, with the engine 5, a region of the intake passage 11 downstream of the throttle valve 13 is small in volume, so that a period of time until pressure in such region is restored to atmospheric pressure after the intake valves 56 are closed is relatively short. Therefore, it is difficult for internal EGR to occur. This is also considered to be one of the causes of the lean limit air-fuel ratio increasing.

With the engine 5, on the basis of the results of experiments, the ECU 70 causes a fuel to be injected from the injector 14 in an idling operation during a period of time after a current intake stroke is terminated and before the next intake stroke is begun. That is, the fuel injection timing (specifically, the timing in which fuel injection is terminated) during idling operation is set to occur during any one of compression stroke, expansion stroke, and exhaust stroke.

Also, the ECU 70 controls the throttle valve 13 or the injector 14 so that an air-fuel ratio amounts substantially to about 14.7 (theoretical air-fuel ratio) not only during traveling but also during the idling operation. For example, the ECU 70 adjusts an intake quantity or a fuel injection quantity to thereby control the air-fuel ratio at the time of idling operation to make the same about 14.2 to about 15.2. In this manner, by making the air-fuel ratio substantially equal to the theoretical air-fuel ratio, it is possible to make effective use of the ternary catalyst 7 in the exhaust passage 12 also at the time of idling operation.

As described above, with the engine 5, a sufficiently atomized and uniform air-fuel mixture can be supplied into the combustion chamber 44 during an intake stroke because the injector 14 is provided downstream of the throttle valve 13, the ratio $\epsilon = Q/V$ of a volume Q of that portion which extends from the throttle valve 13 in the intake passage 11 to the intake openings 52, to the stroke volume V of the cylinder 22 is at most about 0.61, and the fuel injection timing of the injector 14 is set to occur at a time other than the intake stroke. Accordingly, even an operation in a region of low-speed rotation such as an idling operation can be performed stably in a theoretical air-fuel ratio.

Also, with the engine 5, the ignition plug 63 is arranged in the vicinity of the cylinder axis CL, so that it is possible to prevent dispersion in a propagation distance of combustion flames in the combustion chamber 44 and to achieve an improvement in anti-knock property. Therefore, an operation in a theoretical air-fuel ratio can be further made stable. In addition, with the engine 5, a sufficiently atomized and uniform air-fuel mixture is drawn into the combustion chamber 44, so that no problem is practically caused even when an offset of the ignition plug 63 from the cylinder axis CL is small.

Also, with the engine 5, the intake ports 54 preferably include a tumble port and vortex flows are formed within the combustion chamber 44. Therefore, it is possible to accelerate burning in the combustion chamber 44 to stably perform an operation in a theoretical air-fuel ratio. Also, a relatively simple construction makes it possible to form vortex flows in the combustion chamber 44 without any increase in the number of parts.

As described above, with the engine 5, when the intake valves 56 are opened, minimum gaps A between the intake valves 56 and the recess 51 of the cylinder head 23 become equal to or larger than gaps B between the intake valves 56 and the cylinder inner surface 31 in a diametrical direction of the cylinder 22. Therefore, with the engine 5, the intake openings 52 are located close to the cylinder inner surface 31, so that it is possible to ensure an excess space in the vicinity of the cylinder axis CL. Accordingly, it becomes easy to arrange the ignition plug 63 in the vicinity of the cylinder axis CL.

With the engine 5 according to the present preferred embodiment, however, the gaps A may become smaller than the gaps B when the intake valves 56 are opened. The relationship between the gaps A and the gaps B is in no way limited.

With the engine 5, a position of the ignition plug 63 is offset from the cylinder axis CL and especially offset toward the exhaust openings 53. Therefore, the intake openings 52 can be increased in an opened area as compared with the case where the ignition plug 63 is offset toward the intake openings 52. However, according to the number and arrangement of the intake openings 52 and the exhaust openings 53, an opened area of the intake openings 52 can also be in some cases ensured sufficiently even when the ignition plug 63 is offset toward the intake openings 52. In such case, the ignition plug 63 may be offset toward the intake openings 52.

As described above, the intake ports 54 in the present preferred embodiment preferably include a tumble port. However, the intake ports 54 may be other types to have the air-fuel mixture drifting toward the cylinder axis CL and to generate vortex flows in the combustion chamber 44. The intake ports 54 may include swirl ports to generate transverse vortex flows within the combustion chamber 44. For example, the intake ports 54 may include ones to have the air-fuel mixture introduced in a direction tangent to the cylinder inner surface 31 of the combustion chamber 44.

Also, it is not required that the vortex flow generating mechanism be constituted only by the intake ports 54. The vortex flow generating mechanism is not limited in specific constitution. For example, the vortex flow generating mechanism may include a closure member (for example, a projection or the like) that partially plugs a flow passage in the intake port 54.

Also, the vortex flow generating mechanism may include a valve, for example, a valve that partially plugs a flow passage in the intake port 54. The vortex flow generating mechanism may include a control valve or a throttle valve described in, for example, the specification and drawings of U.S. Pat. No. 5,359,972. Contents of the specification and drawings of U.S. Pat. No. 5,359,972 are incorporated herein by reference.

Figure 9:
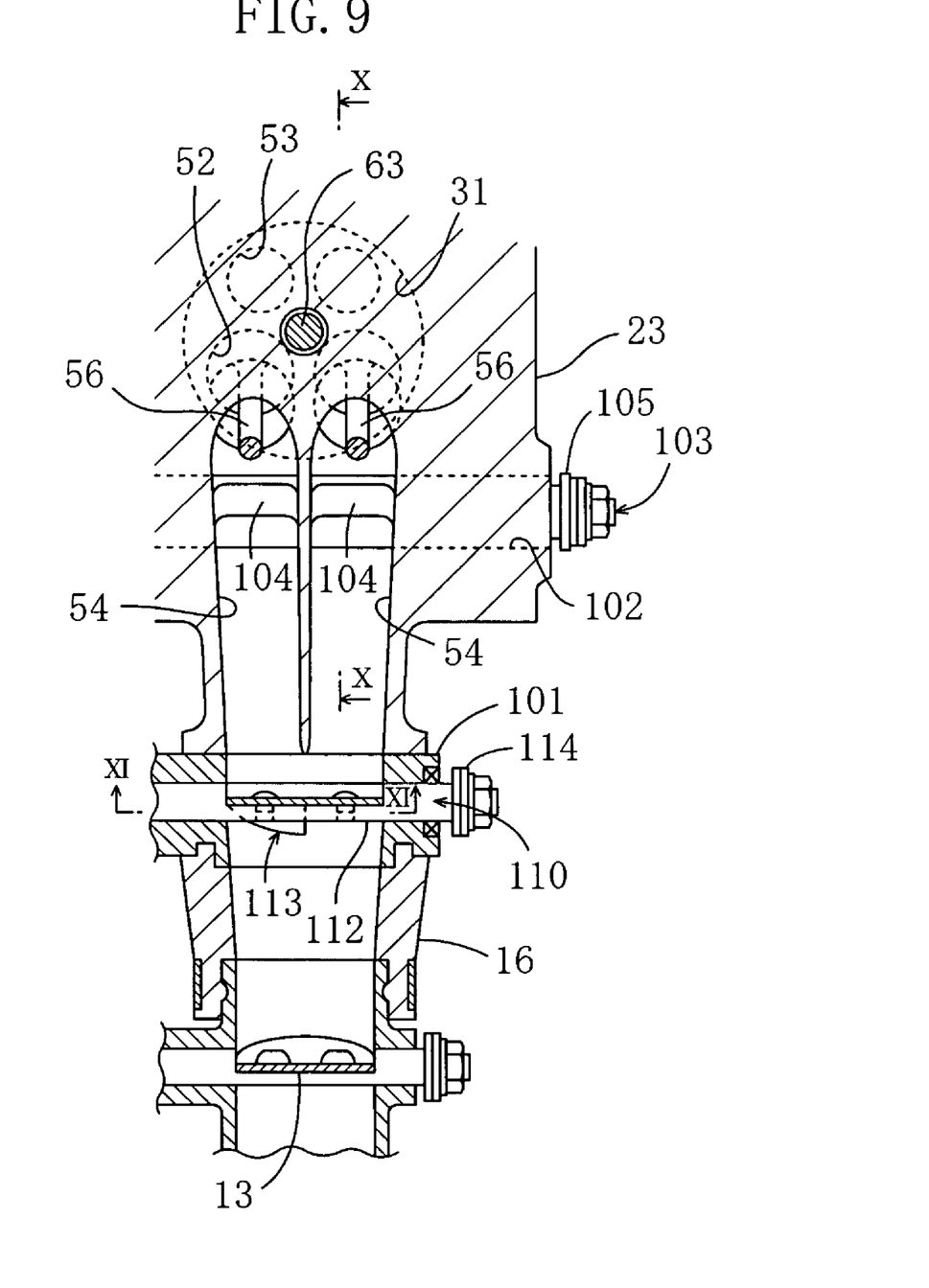
FIG. 9 is a partial, cross sectional view showing an engine according to a modification.

Subsequently, a further preferred embodiment including a valve to generate vortex flows will be described with reference to FIGS. 9 to 11. As shown in FIG. 9, according to the present preferred embodiment, a further throttle body 101 is provided between a cylinder head 23 and a throttle body 16. The cylinder head 23 is formed with a hole 102 that extends in a direction that is perpendicular or substantially perpendicular to intake ports 54. A control valve 103 that varies the flow passage area of the intake ports 54 is arranged rotatably in the hole 102. A connection 105 to which a drive cable or the like is connected is provided at a tip end of the control valve 103. The control valve 103 receives a drive force from the drive cable or the like to be rotated, thereby varying the flow passage area of the intake ports 54.

Figure 10:
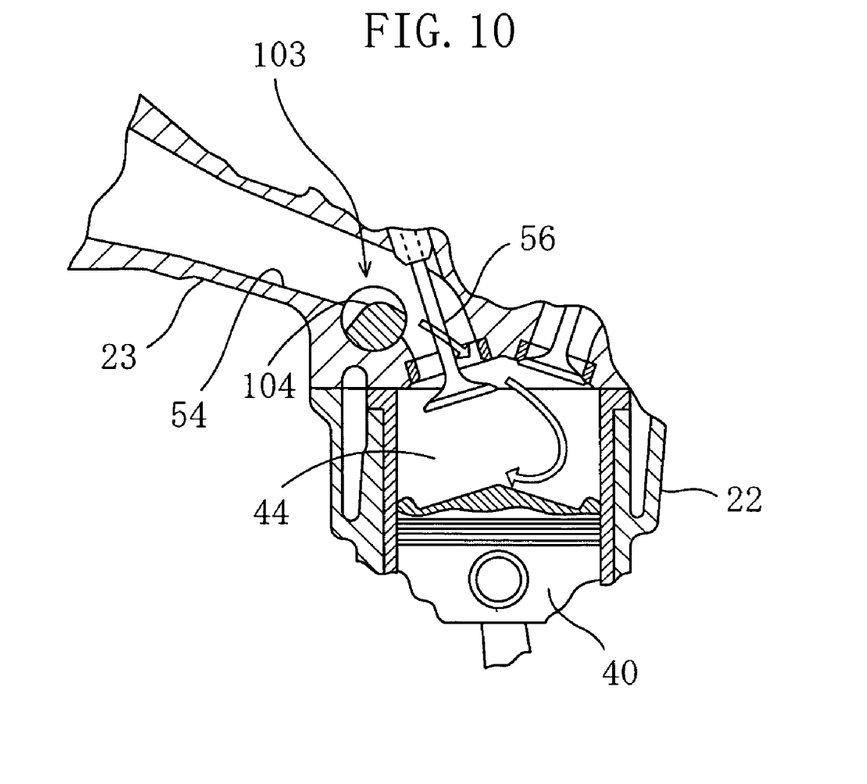
FIG. 10 is a cross sectional view taken along the line X—X in FIG. 9.

As shown in FIG. 10, recesses 104 are formed on those portions of the control valve 103 which are disposed in the intake ports 54. When the control valve 103 rotates, the positions of the recesses 104 are changed, so that the flow passage areas of the intake ports 54 are varied. For example, when the control valve 103 rotates to partially close lower flow passage portions of the intake ports 54, only upper portions of the intake ports are opened to lead to a decrease in flow passage area. Thereby, tumble flows are liable to be formed in a combustion chamber 44.

As shown in FIG. 9, the throttle body 101 is provided with a throttle valve 110. The throttle valve 110 includes a valve shaft 112 that extends through the throttle body 101, a valve plate 113 bolted to the valve shaft 112, and a connection 114 provided at a tip end of the valve shaft 112. A drive cable or the like is connected to the connection 114, and the throttle body 101 receives a drive force from the drive cable or the like to be turned.

Figure 11:
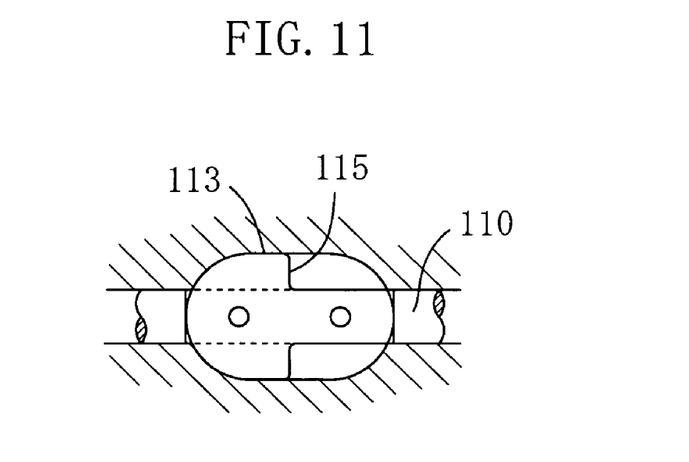
FIG. 11 is a cross sectional view taken along the line XI—XI in FIG. 9.

As shown in FIG. 11, that portion of the valve plate 113, which corresponds to one of the intake ports 54, is formed with a notch 115. Therefore, when the throttle valve 110 is turned, switching is performed between an opened state, in which the both intake ports 54 are opened, and a closed state (a state shown in FIG. 11), in which one of the both intake ports 54 is opened and the other is closed. In the closed state, the air-fuel mixture flows into the combustion chamber 44 only through one of intake openings 52, so that swirl flows are formed in the combustion chamber 44.

In addition, according to the present preferred embodiment, the control valve 103 and the throttle valve 110 may generate tumble flows or swirl flows separately in the combustion chamber 44, and can also generate vortex flows, in which tumble flows and swirl flows mix with each other.

According to the present preferred embodiment, the intake openings 52 and the exhaust openings 53, respectively, are preferably provided two by two. However, the intake openings 52 and the exhaust openings 53 are not limited in number and arrangement. Also, the intake openings 52 and the exhaust openings 53 may be different in number from each other. Likewise, the intake valves 56 and the exhaust valves 57 are not limited in number and arrangement.

The present invention is not limited to the preferred embodiments described above, but various variations and modifications may be made without departing from the scope of the present invention. The presently disclosed preferred embodiments are therefore considered in all respects to be illustrative and not restrictive. The scope of the present invention is indicated by the appended claims rather than the foregoing description, and all changes which come within the meaning and range of equivalence thereof are intended to be embraced therein.

What is claimed is:

1. An internal combustion engine comprising:
   an engine body including a cylinder that defines a combustion chamber, an intake opening that faces the combustion chamber, and an intake passage in communication with the combustion chamber through the intake opening;
   a piston provided in the cylinder;
   an intake valve that opens and closes the intake opening;
   a throttle valve provided in the intake passage; and
   an injector arranged to inject fuel between the throttle valve in the intake passage and the intake opening, wherein an intake stroke, a compression stroke, an expansion stroke, and an exhaust stroke are repeated in this order; wherein
   a ratio of a volume of a portion that extends from the throttle valve in the intake passage to the intake opening, to a stroke volume of the cylinder is at most about 0.61; and
   a time at which fuel injection from the injector is terminated during an idling operation, is within a period of time after an intake stroke is terminated and before a subsequent intake stroke is begun.

2. The internal combustion engine according to claim 1, wherein the ratio is at most about 0.51.

3. The internal combustion engine according to claim 1, further comprising an ignition plug arranged in a position that is spaced from an axis of the cylinder within about 5% of a bore diameter of the cylinder.

4. The internal combustion engine according to claim 1, wherein the engine body comprises a vortex flow generating mechanism that causes an intake gas flowing into the combustion chamber through the intake passage to generate vortex flows in the combustion chamber.

5. The internal combustion engine according to claim 1, wherein the engine body comprises an intake port that defines at least a portion of the intake passage and generates vortex flows in the combustion chamber.

6. The internal combustion engine according to claim 1, wherein the engine body comprises a tumble port that defines at least a portion of the intake passage and generates vertical vortex flows in the combustion chamber.

7. The internal combustion engine according to claim 1, wherein the time at which fuel injection from the injector is terminated during the idling operation occurs during the exhaust stroke.

8. The internal combustion engine according to claim 1, wherein the time at which fuel injection from the injector is terminated during the idling operation occurs during the expansion stroke.

9. The internal combustion engine according to claim 1, wherein the time at which fuel injection from the injector is terminated during the idling operation occurs during the compression stroke.

10. The internal combustion engine according to claim 1, wherein an air-fuel ratio during the idling operation is about 14.2 to about 15.2.

11. A vehicle comprising:
    a vehicle body;
    a wheel mounted to the vehicle body; and
    an internal combustion engine that drives the wheel, wherein the internal combustion engine includes:
       an engine body including a cylinder that defines a combustion chamber, an intake opening that faces the combustion chamber, and an intake passage in communication with the combustion chamber through the intake opening;
       a piston provided in the cylinder;
       an intake valve that opens and closes the intake opening;
       a throttle valve provided in the intake passage; and
       an injector arranged to inject fuel between the throttle valve in the intake passage and the intake opening, wherein an intake stroke, a compression stroke, an expansion stroke, and an exhaust stroke are repeated in this order; wherein
       a ratio of a volume of a portion that extends from the throttle valve in the intake passage to the intake opening, to a stroke volume of the cylinder is at most about 0.61; and
       a time at which fuel injection from the injector is terminated during an idling operation, is within a period of time after an intake stroke is terminated and before a subsequent intake stroke is begun.

* * * * *